US007161801B2

(12) United States Patent
Chen et al.

(10) Patent No.: US 7,161,801 B2
(45) Date of Patent: Jan. 9, 2007

(54) COMMUTATE SILENCER OF COMPUTER SYSTEM

(75) Inventors: Wei-Ming Chen, Yun Lin Hsien (TW); Chao-Jung Chen, Taipei (TW); Wen-Liang Huang, Hsin Chuang (TW); Kai-Hung Lin, Chung Ho (TW)

(73) Assignee: Quanta Computer Inc., Tao Yuan Shien (TW)

( * ) Notice: Subject to any disclaimer, the term of this patent is extended or adjusted under 35 U.S.C. 154(b) by 320 days.

(21) Appl. No.: 10/926,012

(22) Filed: Aug. 26, 2004

(65) Prior Publication Data

US 2005/0207106 A1    Sep. 22, 2005

(30) Foreign Application Priority Data

Mar. 18, 2004   (TW) ............................. 93204126 U

(51) Int. Cl.
*H05K 7/20* (2006.01)
*G10K 11/16* (2006.01)

(52) U.S. Cl. ........................ 361/690; 361/688; 361/691; 361/692; 361/695; 454/184; 181/198; 181/200; 181/201; 181/224

(58) Field of Classification Search ................ 361/683, 361/687, 688, 690–695, 724–727; 62/259.2; 454/184; 165/121–126, 104.33, 104.34, 165/135.69; 181/200–225, 198, 229, 252, 181/255, 258, 268, 286, 288, 290, 282, 291, 181/295

See application file for complete search history.

(56) References Cited

U.S. PATENT DOCUMENTS

| 6,104,608 | A  | * | 8/2000  | Casinelli et al. | ............ | 361/692 |
| 6,198,627 | B1 | * | 3/2001  | Roehling et al.  | ........... | 361/688 |
| 6,222,730 | B1 | * | 4/2001  | Korvenheimo et al. | ..... | 361/696 |
| 6,481,527 | B1 | * | 11/2002 | French et al.    | ............... | 181/201 |
| 6,816,372 | B1 | * | 11/2004 | Huettner et al.  | ............ | 361/695 |
| 6,892,851 | B1 | * | 5/2005  | Lee              | ............................ | 181/224 |

FOREIGN PATENT DOCUMENTS

JP             07295574 A   * 11/1995

* cited by examiner

*Primary Examiner*—Michael Datskovskiy
(74) *Attorney, Agent, or Firm*—Rabin & Berdo, PC

(57) ABSTRACT

A commutate silencer of a computer system is described. The commutate silencer of the computer system is installed at the back end of the computer system, and comprises a shield device, a commutate device and at least one partition. The shield device comprises a first shield and a second shield, in which the first shield comprises an opening, the first shield and the second shield construct a first cavity, and the first cavity includes a plurality of outlets. The commutate device comprises a frame and a plurality of commutate diversion plates, in which the frame construct a second cavity, the diversion plates traverse the second cavity, the second cavity has an inlet and a ventilated opening, and the ventilated opening is connected to the opening of the first shield. The at least one partition is located in the first cavity and the second cavity, so as to separate the inlet, the ventilated opening and the outlets into a plurality of sub-inlets, a plurality of sub-ventilated openings and a plurality of sub-outlets, respectively.

13 Claims, 1 Drawing Sheet

COMMUTATE SILENCER OF COMPUTER SYSTEM

FIELD OF THE INVENTION

The present invention relates to a commutate silencer, and more particularly, to a commutate silencer applied in a computer system.

BACKGROUND OF THE INVENTION

The operating of a computer system produces unnecessary heat. If the unnecessary heat produced during the operation of the computer system is not removed, the efficiency of the computer system will be lowered, and in turn the computer system will be damaged. Typically, a fan is installed in the computer system to dissipate heat and cool the computer system.

With the increasing of the operating speed of the computer system, the heat produced during the operation of the computer system is greatly increased. A high-speed fan is introduced to remove the unnecessary heat produced by the computer system. However, noise made by the high-speed fan is louder than that of a typical fan. In light of these reasons, the optimization design for noise reducing and heat dissipating of the computer system is imperative.

In the heat dissipating design of a conventional computer system, the category of fans is the most important factor when considering to reduce noise made by the computer system. With the use of the high-speed fan, the rotational speed of the fan is greatly enhanced, so that the fan becomes the main source of noise. Therefore, it is necessary to provide a new fan with high efficiency and low noise to meet the market need.

SUMMARY OF THE INVENTION

Therefore, one objective of the present invention is to provide a commutate silencer of a computer system, which is installed at the back end of the computer system. The noise energy can be reduced to achieve the effect of noise silencing by shields, at least one partition and sound absorbing panels. The noise made by the computer system thus can be silenced directly.

Another objective of the present invention is to provide a commutate silencer of a computer system. After the airflow produced by the computer system is commutated, the airflow is guided to outlets and is exhausted from the commutate silencer by using a shield device of the commutate silencer, so that the turbulent flow of the system can be decreased, and the waste heat produced by the computer system is driven to a heat dissipation area. Therefore, the ability of heat convection between the commutate silencer and the computer system can be enhanced to dissipate effectively heat from the computer system.

According to the aforementioned objectives, the present invention further provides a commutate silencer of a computer system, comprising the following elements. A shield device comprises a first shield and a second shield, in which the first shield comprises an opening, the first shield and the second shield construct a first cavity, and the first cavity includes a plurality of outlets. A commutate device comprises a frame and a plurality of commutate diversion plates, in which the frame constructs a second cavity, the commutate diversion plates traverse the second cavity, the second cavity has an inlet and a ventilated opening, and the ventilated opening is connected to the opening of the first shield. At least one partition is located in the first cavity and the second cavity, so as to separate the inlet, the ventilated opening and the outlets into a plurality of sub-inlets, a plurality of sub-ventilated openings and a plurality of sub-outlets, respectively.

According to a preferred embodiment of the present invention, the commutate silencer of the computer system further comprises a plurality of sound absorbing panels, and these sound absorbing panels are respectively located on the first shield and the second shield within the first cavity.

The airflow produced by the computer system can be commutated, guided to the outlets and exhausted from the commutate silencer by the commutate device and the shield device, so that the heat convection between the commutate silencer and the computer system can be enhanced. In addition, the noise energy can be eliminated by the sound absorbing panels on the shield device. Therefore, the objective of heat dissipating and noise elimination can be achieved.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawing, wherein.

DETAILED DESCRIPTION OF THE PREFERRED EMBODIMENT

Figure 1:
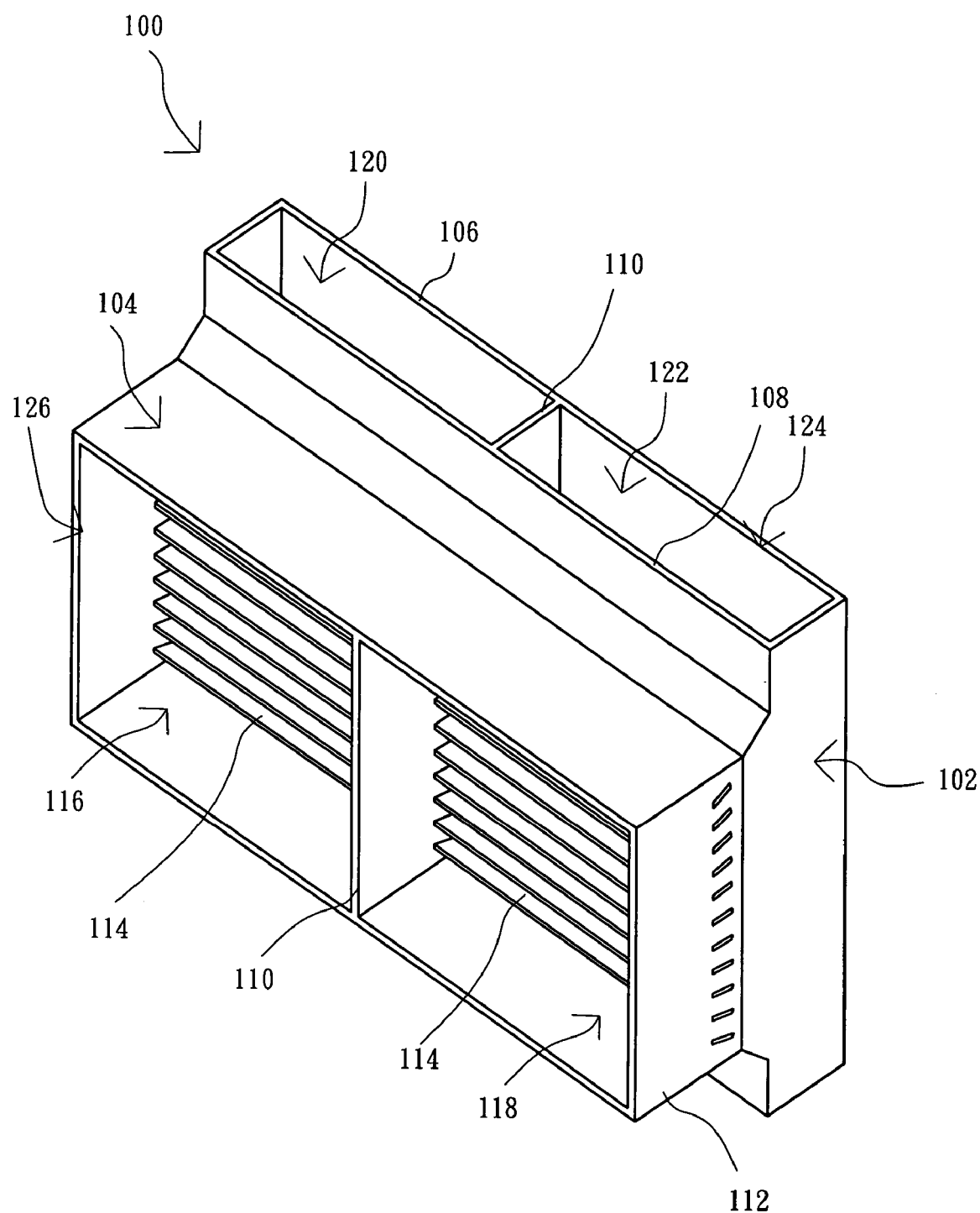
FIG. 1 illustrates a three-dimensional diagram showing a commutate silencer in accordance with a preferred embodiment of the present invention.

The present invention discloses a commutate silencer of a computer system, in which the commutate silencer is installed at the back end of the computer system and has a commutate device and a shield device. Therefore, the turbulent flow of the system can be decreased, the unnecessary heat produced by the computer system is driven to a heat dissipation area, and the noise energy can be eliminated, so as to achieve the objective of heat dissipating and noise elimination. In order to make the illustration of the present invention more explicit and complete, the following description is stated with reference to FIG. 1.

Referring to FIG. 1, FIG. 1 illustrates a three-dimensional diagram showing a commutate silencer 100 in accordance with a preferred embodiment of the present invention. The commutate silencer 100 can be installed at the back end of a computer system. The commutate silencer 100 is mainly comprised of a shield device 102 and a commutate device 104. The shield device 102 comprises a shield 106 and a shield 108, and the shield 106 and the shield 108 construct a cavity 124. The shield 108 has an opening for airflow, which is covered by the commutate device 104. The commutate device 104 is mainly comprised of a frame 112 and a plurality of commutate diversion plates 114, in which the frame 112 constructs a cavity 126, and these commutate diversion plates 114 traversing the cavity 126 formed by the frame 112 are horizontally parallel to each other and assembled in the frame 112.

The commutate silencer 100 further comprises a partition 110, and the partition 110 is located in the cavity 124 and the cavity 126, so as to separate the cavity 124 and the cavity 126 into two portions, respectively, in which the commutate diversion plates 114 of the commutate device 104 pass through the partition 110. The cavity 124 includes at least one main outlet located at one end of the cavity 124, and the cavity 124 preferably includes two main outlets respectively located at the top end and the bottom end of the cavity 124. In the preferred embodiment of the present invention, the main outlet of the cavity 124 at the top end is separated into a sub-outlet 120 and a sub-outlet 122, and the main outlet of the cavity 124 at the bottom end is also separated into two sub-outlets by the partition 110. The cavity 126 of the commutate device 104 includes at least one main inlet and at least one main ventilated opening. In the preferred embodiment of the present invention, the main inlet of the cavity 126 is separated into a sub-inlet 116 and a sub-inlet 118, and the main ventilated opening, which is covered by the commutate diversion plates 114 and connecting the above opening of the shield 108, is separated into two sub-ventilated openings by the partition 110. The shield device 102 is connected to the commutate device 104, and the opening of the shield 108 is connected to the ventilated opening of the frame 112.

The airflow produced by different fans can be separated by the partition 110, so that the heat exhausted by different fans can be respectively exhausted from the system through an individual channel, and the airflow interference between fans can be reduced. In the preferred embodiment, the number of the partition 110 is one, so as to separate the commutate silencer 100 into two channels. However, it is worthy to note that the commutate silencer of the present invention can include no partition, or more than one partition, and the installation of the partition and the number of the partition depend on the fan design of the computer system.

The commutate silencer 100 further comprises a plurality of sound absorbing panels (not shown), the sound absorbing panels respectively adhere to the surfaces of the shield 106 and the shield 108 within the cavity 124. The material of the sound absorbing panels can be made of sound-absorbing foam, for example.

The airflow and noise produced by the computer system enter the commutate silencer 100 through the inlet 116 and the inlet 118 connected to the back end of the computer system. After the diversion of airflow by the commutate diversion plates 114 of the commutate device 104, the airflow is guided to flow through the ventilated opening of the cavity 126 and the opening of the cavity 124 to enter the cavity 124 of the shield device 102, and then is exhausted from the commutate silencer 100 through the outlet 120 and the outlet 122 at the top end of the cavity 124 and the outlets at the bottom end of the cavity 124. Therefore, the loss of flow caused by the shield 106 can be reduced, and the turbulent flow of the system can be decreased, so as to achieve the effect of commutation. In addition, the shield 108 and the shield 106 can lengthen the path of noise propagation, thus resulting in the increasing of noise refracting frequency, and in turn causing the penetrating energy loss of noise. Furthermore, the sound absorbing panels adhered to the shield 106 and the shield 108 can be used to increase the sound absorption loss during noise propagation.

In the present invention, the commutate silencer 100 is installed at the back end of the computer system, so that the airflow produced by the computer system flows through the inlet 116 and the inlet 118, the cavity 126, the commutate diversion plates 114 and the cavity 124 in sequence, and is exhausted from the outlet 122 and the outlet 120 at the top end and at the bottom end of the commutate silencer 100, to achieve the commutation effect. By the sound absorption loss and penetration loss caused by the shield 108, the shield 106, the partition 110, and the sound absorbing panels adhered to the shield 108 and the shield 106, the noise energy can be eliminated effectively. With the application of the commutate silencer 100 of the present invention, the noise can be lowered by 2–3 decibels.

According to the aforementioned description, one advantage of the present invention is that the commutate silencer of the computer system of the present invention is installed at the back end of the computer system. The noise energy can be reduced to achieve the effect of noise silencing by shields, at least one partition and sound absorbing panels, thus the noise made by the computer system can be silenced directly.

According to the aforementioned description, with the application of the commutate silencer of the computer system of the present invention, the airflow produced by the computer system is firstly commutated by the commutate device, and then the airflow is guided to outlets and is exhausted from the commutate silencer by the shield device, so that the turbulent flow of the system can be decreased, and the waste heat produced by the computer system is driven to the heat dissipation area. Therefore, the ability of heat convection between the commutate silencer and the computer system can be enhanced to achieve the objective of effectively dissipating heat.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A commutate silencer for a computer system, comprising:
   a shield device, the shield device comprises a first shield and a second shield, wherein the first shield includes at least one opening, the first shield and the second shield construct a first cavity, and the first cavity includes at least one outlet; and
   a commutate device, wherein the commutate device comprises a frame and a plurality of commutate diversion plates, the frame constructs at least one second cavity, the commutate diversion plates traverse the second cavity, the second cavity has an inlet and a ventilated opening, and the ventilated opening is connected to the opening of the first shield.

2. The commutate silencer for the computer system according to claim 1, further comprising a plurality of sound absorbing panels respectively on the first shield and the second shield within the first cavity.

3. The commutate silencer for the computer system according to claim 2, wherein a material of the sound absorbing panels is sound-absorbing foam.

4. The commutate silencer for the computer system according to claim 1, further comprising a partition located in the first cavity and the second cavity, the partition separating the inlet, the ventilated opening and the at least one outlet into two sub-inlets, two sub-ventilated openings and two sub-outlets.

5. The commutate silencer for the computer system according to claim 1, wherein the inlet of the commutate device is connected to a back end of a computer system.

6. A commutate silencer for a computer system, comprising:
   a shield device, wherein the shield device comprises a first shield and a second shield, the first shield comprises an opening, the first shield and the second shield construct a first cavity, and the first cavity includes a plurality of outlets;

a commutate device, wherein the commutate device comprises a frame and a plurality of commutate diversion plates, the frame constructs a second cavity, the commutate diversion plates traverse the second cavity, the second cavity has an inlet and a ventilated opening, and the ventilated opening is connected to the opening of the first shield; and at least one partition, wherein the at least one partition is located in the first cavity and the second cavity, and the at least one partition separates the inlet, the ventilated opening and the outlets into a plurality of sub-inlets, a plurality of sub-ventilated openings and a plurality of sub-outlets, respectively.

7. The commutate silencer for the computer system according to claim 6, further comprising a plurality of sound absorbing panels respectively on the first shield and the second shield within the first cavity.

8. The commutate silencer for the computer system according to claim 7, wherein a material of the sound absorbing panels is sound-absorbing foam.

9. The commutate silencer for the computer system according to claim 6, wherein the sub-inlets are twice as many as the inlet.

10. The commutate silencer for the computer system according to claim 6, wherein the sub-ventilated openings are twice as many as the ventilated opening.

11. The commutate silencer for the computer system according to claim 6, wherein the sub-outlets are twice as many as the outlets.

12. The commutate silencer for the computer system according to claim 6, wherein the inlet of the commutate device is connected to a back end of a computer system.

13. The commutate silencer for the computer system according to claim 6, wherein a number of the outlets is 2, and the outlets are respectively located on a top end and a bottom end of the first cavity.

* * * * *